United States Patent [19]

Shaffer

[11] 4,320,931
[45] Mar. 23, 1982

[54] INSULATING BEARING AND METHOD OF MANUFACTURE

[75] Inventor: Don L. Shaffer, Cincinnati, Ohio
[73] Assignee: Siemens-Allis, Inc., Atlanta, Ga.
[21] Appl. No.: 106,722
[22] Filed: Dec. 26, 1979
[51] Int. Cl.³ ............................................. F16C 33/00
[52] U.S. Cl. .................................. 308/237 R; 308/37
[58] Field of Search .................... 308/1 R, 37, 237 R, 308/237 A, 238

[56] References Cited

U.S. PATENT DOCUMENTS

| 1,152,681 | 9/1915 | Wieselgreen | 308/1 R |
| 1,998,888 | 4/1935 | Wallgren | 308/237 R |
| 3,048,061 | 8/1962 | Mele | 308/237 R |
| 3,149,887 | 9/1964 | Moyer | 308/237 R |
| 3,924,906 | 12/1975 | Kitaoka | 308/1 R |
| 4,109,978 | 8/1978 | Ernst et al. | 308/237 R |

FOREIGN PATENT DOCUMENTS

| 1525272 | 1/1970 | Fed. Rep. of Germany | 308/237 |
| 1300671 | 6/1962 | France | 308/237 R |

*Primary Examiner*—John W. Shepperd
*Attorney, Agent, or Firm*—Frederick W. Powers, III

[57] ABSTRACT

Bearing adaptable for use in dynamoelectric machine for preventing current from flowing through the bearing itself. A three-part layer including a base material, a ceramic layer, and an adhesion layer is applied sequentially upon the bearing shell. The last layer is then covered with a bearing material, ordinarily babbitt so that the babbitt, is electrically isolated from the bearing shell.

9 Claims, 4 Drawing Figures

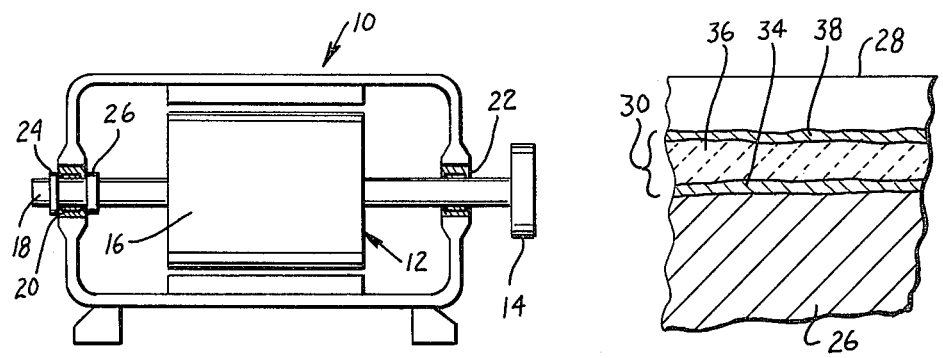
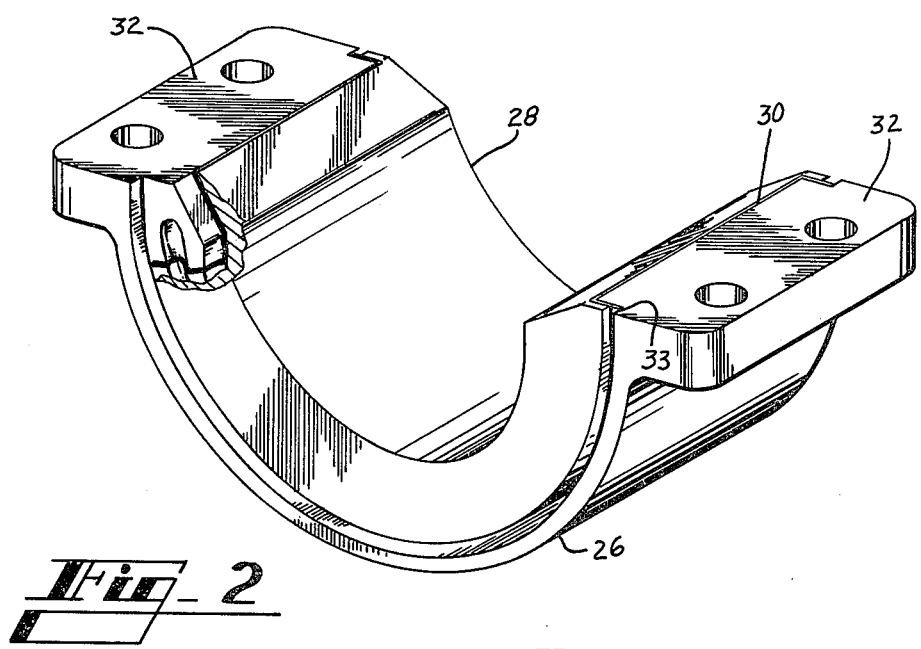
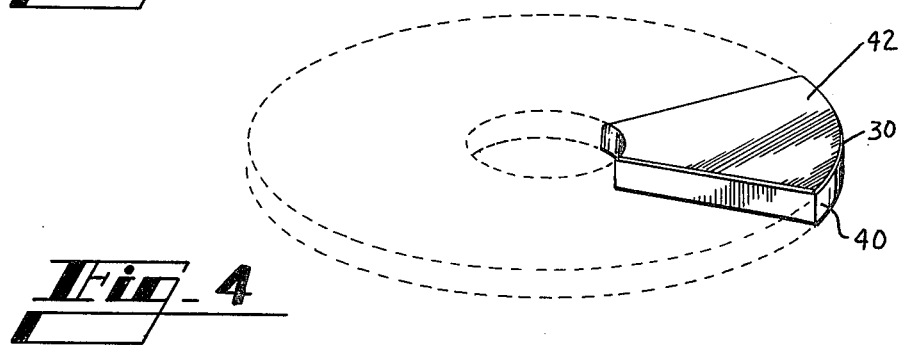

INSULATING BEARING AND METHOD OF MANUFACTURE

BACKGROUND OF THE INVENTION

The present invention relates to bearings, and more particularly to bearings which are electrically insulated.

It is long been recognized that parasitic currents can flow through the rotor shaft of dynamoelectric machines. With some designs, —these shaft currents—may arise from undesired phenomena such as inductive imbalances, circulating currents, or the like.

Frequently the only electrical path between the stator and rotor of such a machine is through the bearing or bearings which support the rotor in the stator. As such bearings are conventionally made of conductive metal, which enables current to flow through the bearings. When this occurs the results are highly desctructive to the bearing surfaces. In particular, the flow of electric current gives rise to erosion of the bearing surfaces. As it is usually desired that the bearing surfaces be as smooth as possible, this deterioration results in a corresponding deterioration of bearing properties, and shortens the life of the bearing, sometimes making it necessary to remove the machine from operation and repair or rebuild it.

This phenemonon has been known for many years, and numerous attempts have been made to construct the bearings which are rugged and serviceable, and yet relatively economical. In past years, efforts were made to produce an insulating effect by using bearings comprised of concentric inner and outer members, between which were disposed insulating materials such as impregnated fabric, plastic, cork, and the like.

More recently efforts have been made to incorporate more modern materials. For example, U.S. Pat. No. 3,924,906-Kitaoka teaches a journal bearing for a dynamoelectric machine which is surrounded by another layer of an insulating ceramic material, which may be applied in molten form. The thin ceramic layer is then impregnated with a curable liquid insulating material, such as varnish, both to prevent contamination of the ceramic material and to effect some lubricity so that the bearing may be moved more easily, and reduce the liklihood of chipping or damage to the insulator surface. It is been found, however, that the insulating surface thus produced is susceptible of injury before and during assembly into the machine, and that maintaining the outside of the coated assembly to a precise tolerance presents additional difficulties. Accordingly, it is object of present invention to provide an improved plain bearing which overcomes the afore-mentioned difficulties.

Another object of present invention is to provide an improved insulated plain bearing wherein the insulation layer is not susceptible of injury.

SUMMARY OF THE INVENTION

Briefly stated, in accordance with one aspect of the invention the foregoing objects are achieved by providing a composite insulation layer on the inner, or bearing-metal side, of a bearing. A first, base layer is applied to the bearing shell, preferably by a plasma spray method. Upon this layer is than disposed a thicker layer of a ceramic insulating material. Upon the insulating material is added a third or "adhesion" layer, preferably of a metallic material, which serves as a binder or adhesion agent between the underlying ceramic insulation layer and the final layer of bearing material, such as babbitt. In a preferred embodiment the ceramic layer is at least 20 mils (0.5 mm) in thickness to prevent the metallic adhesion layer from diffusing through it, and thereby to prevent establishment of an electrical path from the babbitt to the base layer.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjunction with the accompanying drawing in which:

FIG. 1 is a simplified drawing of an electric machine having a shaft journaled in bearings.

FIG. 2 is an isometric view of a portion of a journal-type bearing utilizing the present invention;

FIG. 3 is an enlarged cross-section of a bearing illustrating the relative positioning and identity of the material of the insulating layer; and FIG. 4 depicts a flat thrust-type bearing making use of the present invention.

DESCRIPTION OF A PREFERRED EMBODIMENT

A dynamoelectric machine is shown in FIG. 1 in simplified form, and includes a stator generally indicated at 10 and a rotor 12 therewithin. At one end of the rotor is a power transmitting device 14 which may be a clutch, pulley, drive gear or the like. The laminations and windings of the rotor are represented at 16, and are supported upon a rotary shaft 18. The shaft is in turn supported in the stator by means of bearings 20, 22 which in the illustrated embodiment take the form of sleeve-type, plain bearings. Annular shoulders 24, 26 may be formed on shaft 18 to axially locate the shaft within the machine.

As is well known to those skilled in the art, an electrical potential frequently exists upon the rotor of the machine which is substantially above that of the stator, the latter normally being considered ground potential. This difference in potential will give rise to a current flow from the rotor to the stator at any point where electrical continuity exists. As the rotor and stator ordinarily are only in physical contact at the bearings, the bearings then form the only available current transfer point between the rotor and stator.

It will be recognized that the bearings of the type shown are ordinarily provided with a lubricant which forms a viscous film between the surfaces of the shaft and the surrounding bearings. However, despite the fact that lubricants are normally good insulators, the potential difference between the rotor shaft and the stator (and thus the bearing surface) is frequently sufficient to cause current to flow through the lubricating film. When this happens the confronting surfaces of the shaft and bearing erode. This in turn roughens the surfaces and accelerates wear, culminating in failure of the bearing and the necessity of taking the machine out of service to repair or rebuild it.

In order to electrically isolate the rotor from the stator, numerous approaches have been attempted including providing dielectric materials between the bearing shell and the stator, and the coating of the bearing shell with flame-sprayed ceramic material. According to the present invention, however, an insulating layer is provided in such a manner that it is protected from physical damage, yet provides the necessary isolation between the rotating and stationary motor parts. As shown in FIG. 2, the body of a bearing 26, (hereinafter referred to as to a "shell" although it is frequently of heavy, sturdy construction), is lined with a bearing metal such as babbitt. The inner, plain bearing or babbitt layer 28 is machined to a closed tolerance, and receives a rotating shaft therein in the case of the sleeve-type bearing shown. It will be recognized, however, the other types of bearings, such as the plane segmented type, may make use of the present invention. In the illustration of FIG. 2, a composite insulating layer 30 is disposed between the bearing shell 26 and bearing material 28. In order to prevent the babbitt 28 from being "wiped" across the insulating layer 30 to make electrical contact with shell 26 during machining of the upper surfaces 32, a chamfer or the like (herein generally termed a "step") is formed at the intersection of the bearing-receiving surface and the flange surfaces 32. The insulating layer 30 extends up the surface of the step, while the babbitt extends only part way up the step so that a band of the insulating layer is exposed whose width is greater than the thickness of the layer. This has the effect of widening the effective thickness of the insulating layer, due to the angle of the "step", so that when a milling cutter or the like sweeps across faces 32 it will not "smear" or wipe the babbitt completely across the insulating layer and establish a conductive path to the material of shell 26. In the embodiment depicted in FIG. 2 a groove or undercut 33 is formed and masked when the bearing material is applied so that a band of insulating material extends into the undercut, beyond the edge of the bearing material. Again, this construction avoids the "wiping" of the bearing material on to the material of the bearing shell.

Referring now to FIG. 3, there is shown in further detail the orientation and make up of the composite insulating layer 30. Specifically, the material of shell 26, which is commonly a ferrous material such as cast iron or steel, is overlain by a thin first, or base, layer 34. The first layer intimately contacts the bearing shell and it adheres thereto, and further is receptive to a second, ceramic layer 36 which provides the insulating characteristics which are sought. The insulating layer is surmounted by an adhesion layer 38, preferably of a metal which is compatable with both the material of the ceramic layer and the bearing material 28, ordinarily babbitt.

In practicing the present invention, the bearing shell 26 is prepared by grit-blasting and/or by a chemical cleaning process such as treating the metal with a proprietary etching and cleaning agent such as that trademarked "Kolene" or the equivalent. An additional, further mechanical interlocking may be achieved by machining grooves into the surface of the bearing shell.

The base layer 34 is then applied over the surface of the bearing shell, preferably by using a commercial plasma spraying process. Apparatus for plasma spraying fusable materials are commercially available, for instance from Metco, Incorporated of Westbury, N.Y. Further, other materials, temperature and other process parameter is are well known to those skilled in the art and may further be obtained from trade publications such as the "Metco Flame Spraying Processes" and "Handbook of Coating Recommendations" both published by Metco, Inc. of Westbury, N.Y. According to good industrial practice, the base layer 34 may be formed of nickel aluminide or the like, and is preferably has a thickness of approximately 0.002 to 0.004 inches (0.05 to 0.10 mm.). Immediately thereafter the insulating layer 36 is deposited, preferably by the same plasma spray process. The ceramic is preferably formed of aluminum oxide.

According to the present invention, the ceramic layer is then covered with an adhesion layer of a metal such as copper, preferably by the same plasma spray process referred to hereinabove. The present inventor has discovered that the presence of such an adhesion layer provides the necessary physical bond between the succeeding layer 28 of bearing material and the preceding layer 36 of ceramic material. In a preferred embodiment, the adhesion layer is applied to a thickness of approximately 0.002 to 0.005 inches (0.05 to 0.0125 mm).

The inventor has further found that the adhesion layer 38 has a tendency to migrate or penetrate through insulating layer 36, and establish electrical continuity between itself (and thus the bearing material 28) and the bearing shell 26. In order to avoid this, it is been found that the ceramic layer 36 should be made at least 0.020 inches (0.5 mm) thick.

The physical strength of the structure remains adequate for industrial purposes and the desired electrical insulating characteristic is maintained.

The final, bearing layer of babbitt 28 may be applied by a plasma spray process, by spin casting, or any other appropriate method. As the fusion temperature of the composite insulation layer is substantially higher than that of the babbitt, it is not affected by the heat of the molten babbitt. Further, the strength of the bond between the material is such as to allow the babbitt to be machined to close tolerances so that the finished bearing assembly, including the outer surfaces of bearing shell 26 and the inner surface of bearing material 28, may be machined to an exact dimension.

As will be evident from the foregoing description, certain aspects of the invention are not limited to the particular details of the example illustrated, and it is therefore contemplated that other modifications or applications will occur to those skilled in the art. It is accordingly intended that the appended claims shall cover all such modifications and applications as do not depart from the true spirit and scope of the invention.

FIG. 4 illustrates a plane or thrust-type bearing formed according to the present invention. Such a bearing may be comprised of a single disc or a plurality of segments, each being independently supported. The underlying structure or shell 40 has a composite insulating layer 30 formed upon it, and a final layer 42 for a bearing material such as babbitt overlying the insulating layer 30. As in the case of the sleeve-type bearing shown in FIG. 2, steps or undercuts may be used at the edges of the bearing to prevent electrical short circuits due to "wiping" during the machining process.

What is claimed as new and desired to be secured by Letters Patent of the United States is:

1. A plain bearing for a dynamoelectric machine, said bearing being adapted to be received in a stationary member and to receive a rotating member and provide electrical isolation there-between, comprising:
   a bearing shell having an outer surface and a inner surface within which the rotating member is to be disposed;

an inner layer of bearing material formed in said bearing shell for slidingly supporting the surface of the rotating member; and insulating means disposed between said bearing shell and said bearing material and physically bonding said shell and said bearing material together, including;

(i) a base layer in intimate contact with said bearing shell, (ii) a ceramic layer overlying said base layer, and (iii) a metallic adhesion layer between said ceramic layer and said layer of bearing material;

whereby said layers permanently bond said inner layer of bearing material to said bearing shell to form a monolithic structure whose inner, bearing surface is electrically isolated from its outer, shell surface.

2. The invention as defined in claim 1, wherein said bearing shell is formed of a metal, and said base layer comprises a metallic material.

3. The invention defined in claim 2, wherein said base layer is formed of nickel aluminide.

4. The invention defined in claim 1, wherein said adhesion layer is formed of copper.

5. The invention defined in claim 4, wherein said ceramic layer comprises aluminum oxide.

6. The invention defined in claim 1, wherein said bearing comprises at least one flat surface.

7. The invention defined in claim 6, wherein said bearing comprises a radial array of flat segments.

8. The invention defined in claim 1, wherein said bearing comprises a diametrically split, cylindrical journal bearing.

9. The invention defined in claim 8, wherein said journal bearing is provided with a step at the intersection of the split and the inner bearing surface, said ceramic layer extending into the step such that the inner side thereof is not covered by said bearing material.

* * * * *